April 25, 1967
M. J. NISSMAN
3,315,946
MIXING AND BLENDING DEVICE
Filed May 28, 1965
2 Sheets-Sheet 1
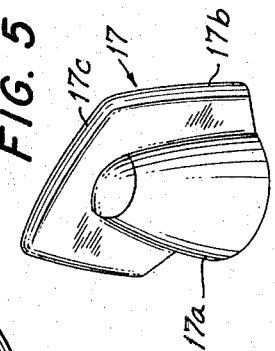
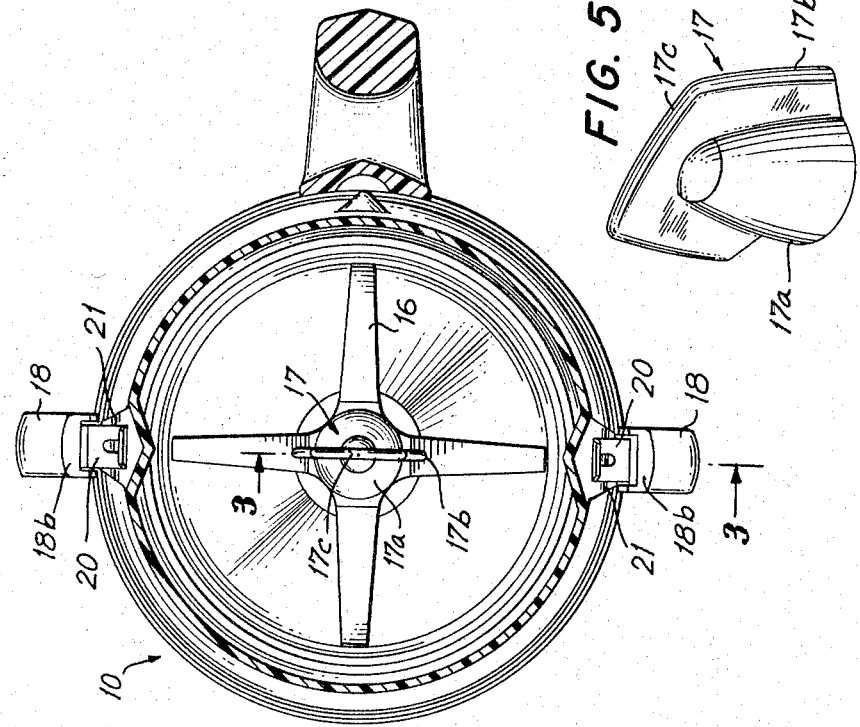
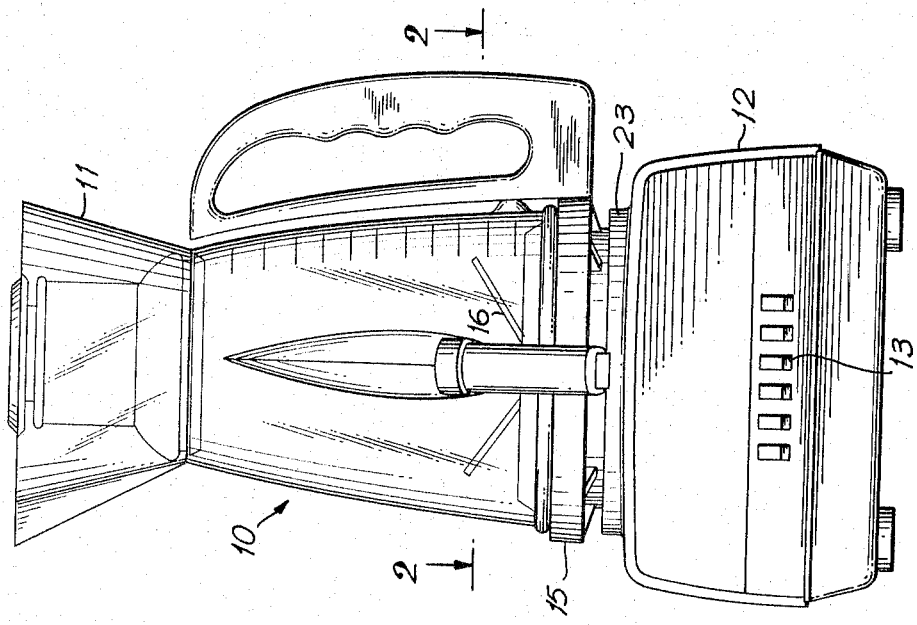
INVENTOR
MARVIN J. NISSMAN
BY Marvin Trimas
ATTORNEY April 25, 1967 M. J. NISSMAN 3,315,946
MIXING AND BLENDING DEVICE
Filed May 28, 1965 2 Sheets-Sheet 2

INVENTOR
MARVIN J. NISSMAN
BY Marvin Trimas
ATTORNEY

United States Patent Office 3,315,946
Patented Apr. 25, 1967

3,315,946
MIXING AND BLENDING DEVICE
Marvin J. Nissman, Brandywood, Wilmington, Del., assignor to Ronson Corporation, Woodbridge, N.J., a corporation of New Jersey
Filed May 28, 1965, Ser. No. 459,806
8 Claims. (Cl. 259—108)

This invention relates generally to mixing and blending devices of the type having a motor driven impeller.

It is a principal object of the invention to provide an improved mixing device whose jar, base and blade holding members are separable into easily cleaned parts which must be properly assembled before the mixer or blender can be safely operated.

It is a further object of this invention to provide a safety latch which functions to maintain a jar in sealing arrangement with the base of a blender and also functions to prevent rotation of the blade impeller unless the blender parts are properly assembled so as to shield the user from the high speed blades.

It is another object of this invention to provide an improved mixer or blender which will be durable and efficient in use, one that will be simple and easy to manufacture, and one which can be placed upon the market at a reasonable cost.

A more specific object is the provision in a mixing device of a self-contained, inexpensive and reliable mechanical latch to prevent unsafe operation of the mixing device.

A further salient object of this invention is the provision of a spinner nut which is so constructed as to prevent cavitation in mixers or blenders and which is readily operable by the housewife to disengage the blades from the blender without the use of tools, except for a key to prevent rotation of the shaft.

With these and other objects in view, the invention consists in the novel construction, arrangement and formation of parts, as will be hereinafter more specifically described, claimed and illustrated in the accompanying drawings, in which:

FIG. 1 is a plan view of a blender showing the parts in operative relationship;

FIG. 2 is a top view taken along the lines 2—2 in FIG. 1 showing the latches engaging corresponding lips on the blender jar;

FIG. 5 is a perspective view of a spinner nut.

Figure 3:
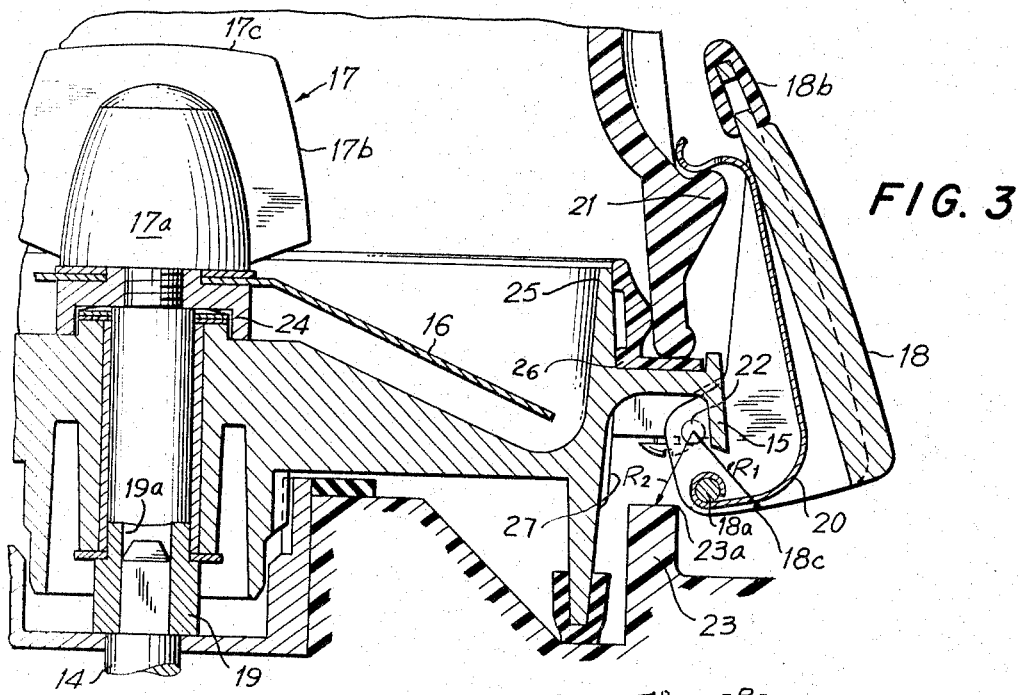
FIG. 3 is a partial cross section taken along the line 3—3 of FIG. 2 showing the cooperation among the latch, jar, dip ring and blender base in engaged position.

Many items are commercially available to the housewife for use in the kitchen to render the preparation of foods simpler. Electrical appliances having high speed blades driven by a powerful motor are well suited to this task. Such appliances, however, can cause a great deal of harm if one is not extremely careful in using them because the blades which macerate foodstuffs must necessarily rotate at extremely high speeds.

This invention seeks to make an electrically driven appliance such as a blender having high speed blades safe so that the user of the device cannot be harmed.

Referring to FIG. 1 it can be seen that the blender generally denoted by the numeral 10 includes a jar 11 and a base or motor housing 12 having speed controls 13 therein which vary the speed of the blades in a known fashion from low r.p.m. to high r.p.m. The jar 11 is removable from the base 12 by merely lifting the latter therefrom. The removal of the jar exposes the high speed blades 16 which are operatively connected to the motor through a drive shaft 14 which is driven by an electric motor (not shown).

The cup base 15, blender blades 16 and spinner nut 17 which holds the latter elements together comprise a subassembly with the jar 11, and latch members 18. The latch 18 holds the jar 11 and cup base together in sealing relationship. The latter elements can be conveniently separated from each other in order to facilitate cleaning of them without having to immerse the motor unit located in base 12 in water which, of course, would have very harmful effects on the motor and the blades are easily separable from the motor shaft to enable them to be safely cleaned.

The motor shaft 14 can be splined (not shown) so as to mate with corresponding splines on the shaft 19 which carries the blades 16 and spinner nut 17. Actually the shaft 14 can be square, rectangular or D-shaped and be received in a square, rectangular or D-shaped socket 19a in the shaft 19 or be connected in any manner. Thus, by placing the jar subassembly comprising the jar 11 cup base 15, blades 16, spinner nut 17 and latches 18 on the motor base 12, the motor shaft 14 which is driven by an electric motor (not shown) mates with the shaft 19 holding the blades 16 and can be driven thereby when the motor is actuated.

The jar 11 can be made of any material such as metal, glass or plastic and can be formed with ribs 21 projecting therefrom. The ribs 21 are formed with a rounded lip portion which acts to receive a latch spring member 20. The latch spring 20 is pivotally attached to the latch base 18a as shown best in FIGS. 3 and 4. The latch spring 20 is shown in latched position by the full line representation in FIG. 3. The dashed lines in FIG. 4 indicate the position where the latch has been released and no longer maintains the jar on the cup base 15. The main latch body base 18 has a portion 18b which can be grasped by the fingers and thereby placed in the FIG. 4 released position and the FIG. 3 actuated position. The latch body 18 is pivotally attached to the cup base 15 by means of a pin 22 shown in FIGS. 3 and 4.

The blender further includes a drip-ring 23 on the motor base 12 which functions to trap liquids and solids and prevent their entrance into the motor housing where they could disturb the efficient operation of the motor. The drip-ring 23 also cooperates with the latch body 18 such that the blade shaft 19 cannot be coupled to the motor shaft 14 unless the jar is properly placed, i.e., when it is latched thereon by means of the latches 18 on the ribs 21, on the cup base 15 as shown in FIG. 3. It is only then that the shafts 14 and 19 can be joined. In this manner the upper blade shaft 19 and blades 16 cannot be actuated unless they are completely covered by the jar 11 and the jar is latched to the cup base 15 in a sealed manner by using a seal 27 preventing the user's hand from contacting the blades 16. Thus if the jar 11 is merely loosely placed over the shaft 19 carrying the blades 16 in an unstable manner, the blade shaft will not be actuated because the motor shaft will not mate with shaft 19. Only when the jar 11 is placed on the cup base 15 and the latches 18 hold the jar firmly in place on the cup base 15 can the blade holding shaft 19 be actuated.

Figure 4:
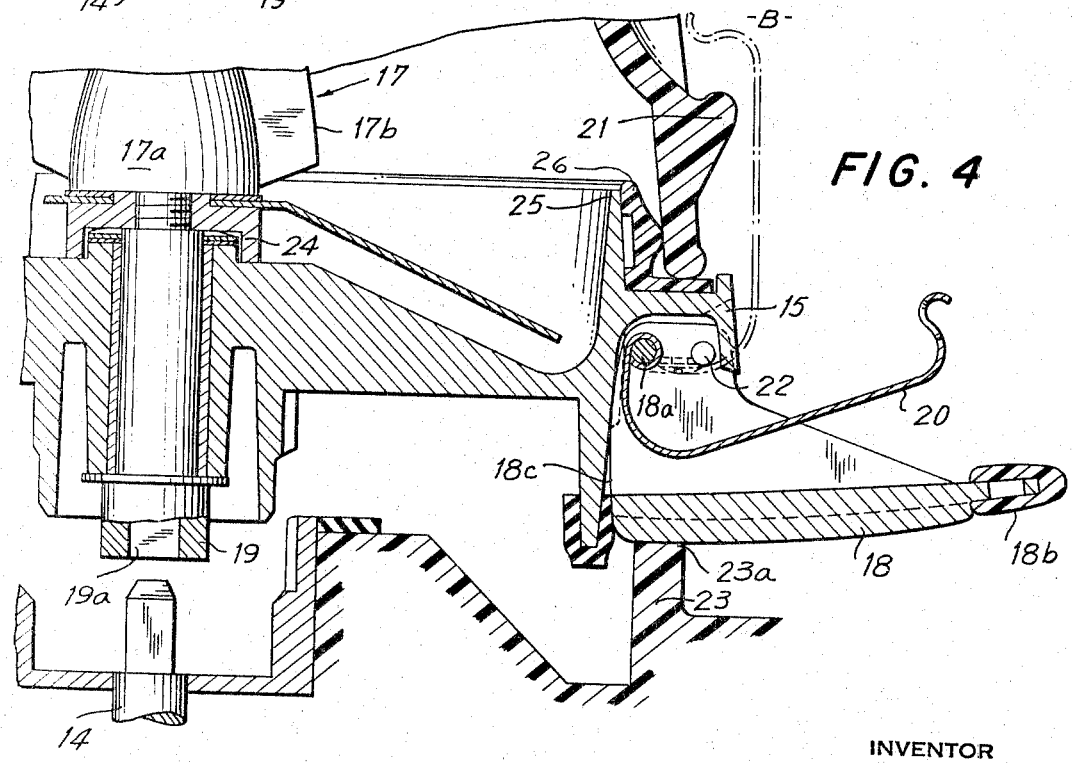
FIG. 4 is a partial cross section showing the latch disengaged from the blender jar.

When the latch body 18 is lowered to the position shown in FIG. 4, the latch spring 20 raises to the FIG. 4 position shown in dashed lines because the spring 20 is pivotally attached to the latch body at 18a and moves to the raised FIG. 4 dashed line position and thus can be removed from the rib 21 and the jar 11 can be removed from the cup base since the restraining force of the latches have been removed. The latch body 18 must be placed in its lowermost FIG. 4 position in order for the spring 20 to be rotated to the dashed line FIG. 4 position and thus raised off the rib 21. Thus if the jar and cup base subassembly is affixed to the motor shaft and to the motor base, the latch body 18 cannot be lowered to its lowest position because of the interference of the drip ring 23 at the edge 23a with the lower portion of the latch 18 as shown in FIG. 3. The subassembly must therefore be lifted a suitable distance above the drip ring which in turn disengages the motor drive shaft 14 from the blade holding shaft 19. Thus, referring to FIG. 3, it can be seen that the lower portion 18c of the latch 18 pivots about the axis 22. The radius $R_1$, defined by the line extending between the pivot pin 22 and the lower portion 18c of the latch 18, is larger than the radius $R_2$ defined by the line extending between the pin 22 and the lip 23a when the motor shaft 14 is in driving relationship with the driven blade shaft 19 and the unit is ready for use. Since $R_1$ is larger than $R_2$, the latch 18 cannot be rotated in the clockwise direction because the lower position 18c of the latch 18 is interfered with by the edge 23a of the drip ring 23. However, if the jar 11 is lifted away from the drip ring 23 along with the latch attached parts (cup base 15, jar 11, latches 18, and blades 16) then the drip ring 23 will not interfere with the latch 18. The latch 18 can then be placed in the FIG. 4 position, the springs 20 will raise off the lugs 21 and the jar 11 can be separated from the other components. Naturally, the shaft 14 and mating socket 19 must be dimensioned such that the motor shaft will be out of driving relation with the blade shaft 19 when the latch is lifted high enough to avoid interference with the edge 23 of the drip ring. Similarly in applying the cup base 15, blades 16 and jar 11 to the motor base 12, the latches 18 must positively attach the jar to the cup base 15 thus covering the blades or the shafts 14 and 19 cannot be mated and the blades 16 will not be actuated. The user of the device is thus saved from harm.

If the cup base 15 is placed on the motor unit and the jar 11 is not placed on the cup base 15 whereby the blades 16 are exposed, then the latches 18 will interfere with the lip 23 and the motor drive shaft 14 will not couple with the socket 19a of the shaft 19. This warns the user that the latches 18 and members 20 must latch the jar 11 in place. The protuberance 26 keeps the spring member 20 in a raised position so it can be conveniently grasped by the user. When the jar is placed on the cup base 15 and latched by the members 20 and latches 18 as in the FIG. 3 position the cup base can be lowered into the motor unit since the interference with the lip 23 has been removed and the drive shaft 14 and blade shaft 19 can be coupled.

The spinner nut 17 functions to hold blades 16 on the shaft 19 along with the bushing 24 and the base 15. The spinner nut 17 has a threaded socket (not shown) therein which is attached to threadedly engage with a similarly threaded portion of the shaft 19. The spinner nut includes a cone or hub 17a and the latter cone carries thereon wings 17b. Ordinarily, when blades comminute foodstuffs a vortex is formed having an interior portion where no food is present. The vortex is a void which runs through the center of the material. Ordinarily the blades in a blender throw liquids angularly up the walls of the blender jar and the fluids travel up the walls of the blender in a toroidal path. When the momentum of the fluid is spent it falls down through the vortex and into the blades. When using viscous substances such as mashed potatoes the heavier mass of substance does not readily travel up the walls of a blender jar and travels generally in a horizontal path. The viscous materials tend to gather above the blades because air bubbles cannot escape through a vortex since the latter is not readily maintained with viscous substances because the closing in of the slow moving mass of material over the blades prevents the maintenance of a vortex. The pressure built up over the blades holds the material suspended above the blades.

The use of a spinner nut 17 spaced above the blades breaks into the suspended mass above the blades and disperses this material down to the blades. This leaves space between the blades and the wings 17b, 17c of the spinner nut 17 where additional mass of viscous material can fall and again be dispersed into the blades 16 below.

According to this invention, the spinner nut has been designed having a vertical planar surface such as wings 17b thereon which are interconnected by a member 17c which is of relatively long length. The wings 17b taper upwardly slightly to meet the latter connecting member. The thickness of the wings is relatively small in relation to the diameter of the cone, thus, the diameter of the cone is approximately .875 inch at its largest diameter and the width of the wings is nine hundredths inches. The shape of the spinner nut permits the comminuted materials to fall by gravity into the path of the spinner wings 17b where they are whisked into the blade cutting portions 16 and are further comminuted. The latter spinner nut is particularly advantageous when used with viscous substances such as mashed potatoes since the wings break up any tendency of the mass to destroy the vortex.

Actually the shape of wings 17b is relatively unimportant. It is important however that non-continuous extensions go beyond the cone or hub 17a because it is the latter extensions which break up the tendency of viscous materials to cavitate and form a hollowed out high pressure zone preventing the foodstuffs from coming into contact with the blades.

In order to separate the blades 16 from the shaft 19 and from the blender base 15 the user need only turn the spinner nut and unscrew it from the threaded shaft 19. No special tools are needed to accomplish this task since the spinner nut is relatively large. A large amount of torque can be exerted in applying or removing the spinner from the shaft in order to place the blades either on or remove them from the shaft 19. Each half of wing 17b extends beyond the center of the cone 625 thousandths at the uppermost portion of the wing.

The blades 16 are relatively long and are quite close to the edges 25 of the blender base. In this manner the blades are able to contact material which generally clings close to the walls. For example, a carrot being hit by the blades one time will be thrown against the wall 25 and if the blade were not close to the wall it would not contact the carrot which could remain at the wall of the blender base and not become mashed. Having blades which extend close to the blender base wall, the latter disadvantage is overcome and all materials must necessarily fall into the path of the high velocity blades. For example, a blade having an overall length of 4 inches could be used with a cup base having an internal diameter of 4½ inches leaving a ¼ inch or less spacing between the blade tip and the wall of the cup base.

While the invention has been disclosed as embodied in a household blender of the above described specific form, it should be understood that changes may be made therein without departing from the invention in its broader aspects within the scope of the appended claims.

I claim:
1. A blender which comprises:
   (a) a support;
   (b) a motor mounted in said support;
   (c) a cup base;
   (d) a shaft journalled on said cup base;
   (e) an agitator fixed to said shaft;
   (f) said cup base mounted on said support;
   (g) a jar on said cup base;
   (h) latch means extending between said cup base and said jar to releasably hold the jar and cup base together;
   (i) the output shaft of the motor operatively connected to the cup base shaft when the jar and cup base are latched by said latch means;
   (j) said support including an interfering edge thereon preventing operation of the agitator unless the jar and cup base are latched together.

2. A blender as defined in claim 1 wherein said jar has protuberances thereon engageable with said latch means to maintain said jar and said cup base in contiguous relation.

3. A blender as defined in claim 1 wherein said latch means is pivotally connected to said cup base.

4. A blender as defined in claim 1 wherein said interfering edge is in the path of movement of said latch means when the motor output shaft and the cup base shaft are operatively engaged.

5. A mixing device which comprises:
 (a) a support;
 (b) power operated drive means having an output shaft mounted on said support;
 (c) an interfering edge on said support;
 (d) a base member on said support;
 (e) a jar removably mounted on said base member;
 (f) a shaft on said base member;
 (g) blade means fixed to said shaft;
 (h) latch means operatively connected to said base member;
 (i) the latch means having a base portion which is precluded from rotation by the interfering edge as long as the output shaft and the base shaft are operably engaged.

6. A blender which comprises
 (a) a support;
 (b) a motor mounted in said support;
 (c) a cup base;
 (d) a shaft journalled on said cup base;
 (e) an agitator fixed to said shaft;
 (f) said cup base mounted on said support;
 (g) a jar on said cup base;
 (h) latch means extending between said cup base and said jar to releasably hold the jar and cup base together;
 (i) the output shaft of the motor operatively connected to the cup base shaft when the jar and cup base are latched by said latch means;
 (j) said latch means comprising:
  (i) a body;
  (ii) a spring member pivotally attached to said body;
  (iii) said spring member being releasably attachable to a protuberance on the jar.

7. A mixing device which comprises:
 (a) a support;
 (b) a jar on said support to contain foodstuffs therein;
 (c) drive means having an output shaft extending from said support;
 (d) a spinner nut mounted on said output shaft;
 (e) an outwardly extending vertical planar surface mounted on said spinner nut such that rotation of said spinner nut effects the formation of a vortex when the foodstuffs are comminuted;
 (f) blade means spaced below said spinner nut and mounted on said output shaft.

8. A mixing device as defined in claim 7 in which the spinner nut includes:
 (a) a hub portion from which said wing means extend.

References Cited by the Examiner

UNITED STATES PATENTS 1,402,380    1/1922    Schaedler.
2,530,455    11/1950    Forss.

FOREIGN PATENTS 152,651    8/1953    Australia.
1,038,727    9/1958    Germany.
511,651    1/1955    Italy.

WALTER A. SCHEEL, *Primary Examiner.*

R. W. JENKINS, *Assistant Examiner.*